United States Patent [19]

Peirish, Jr. et al.

[11] 4,224,599

[45] Sep. 23, 1980

[54] VISUAL WARNING APPARATUS FOR EMERGENCY VEHICLES

[75] Inventors: Alfred J. Peirish, Jr., Fountain Valley; Robert E. Knepshield, Costa Mesa, both of Calif.

[73] Assignee: International Telephone and Telegraph Corporation, New York, N.Y.

[21] Appl. No.: 720,752

[22] Filed: Sep. 7, 1976

[51] Int. Cl.² ............................ B60Q 1/52; F21M 3/18
[52] U.S. Cl. ........................................ 340/84; 362/61; 362/347; 340/50
[58] Field of Search ............... 340/84, 87, 50; 362/61, 362/241, 347

[56] References Cited

U.S. PATENT DOCUMENTS 3,404,371  10/1968  Gosswiller ........................... 340/87

Primary Examiner—Donald J. Yusko
Attorney, Agent, or Firm—A. Donald Stolzy

[57] ABSTRACT

A visual warning apparatus of the type used on police and fire department and other emergency vehicles in which a reflector is positioned relative to a rotating signal light so when the light rotates, light rays deflected off the reflector will extend forwardly of the vehicle while producing a lateral shifting of the light rays. The reflector comprises a plurality of convex sections which produce a highly active light signal.

11 Claims, 4 Drawing Figures

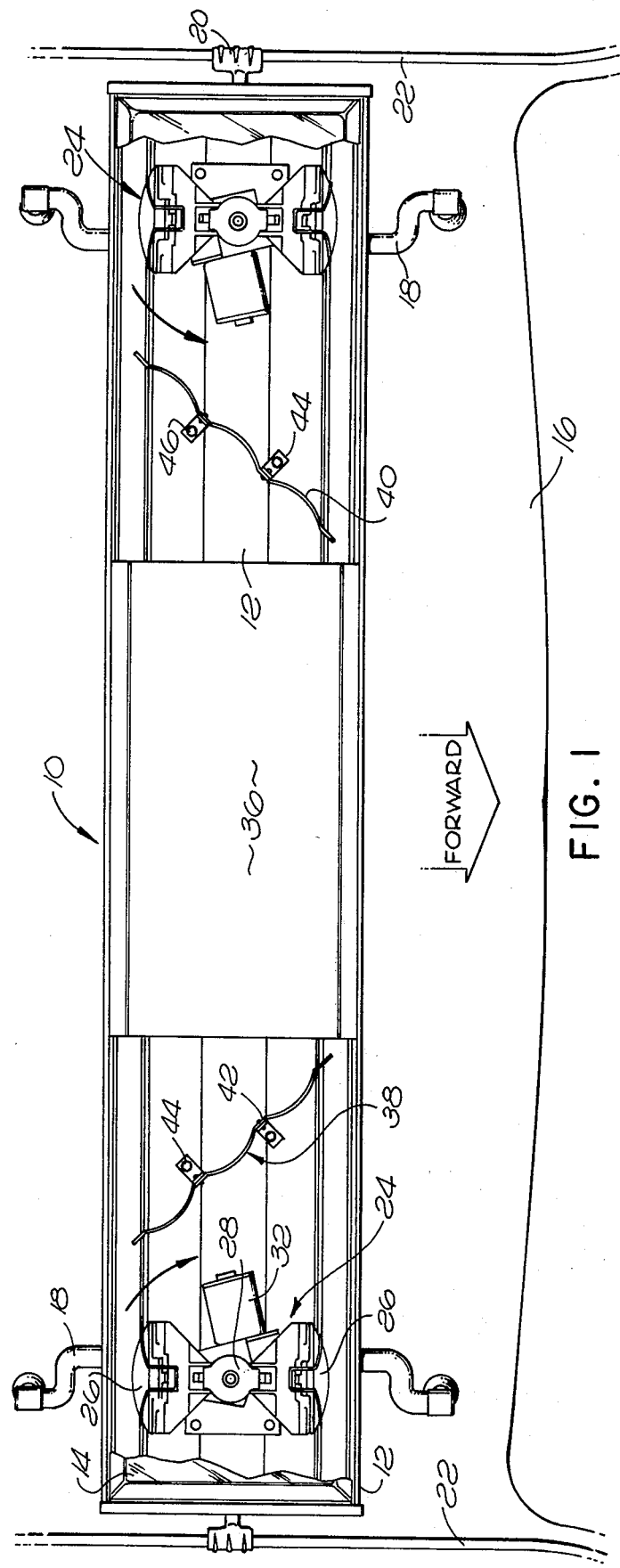
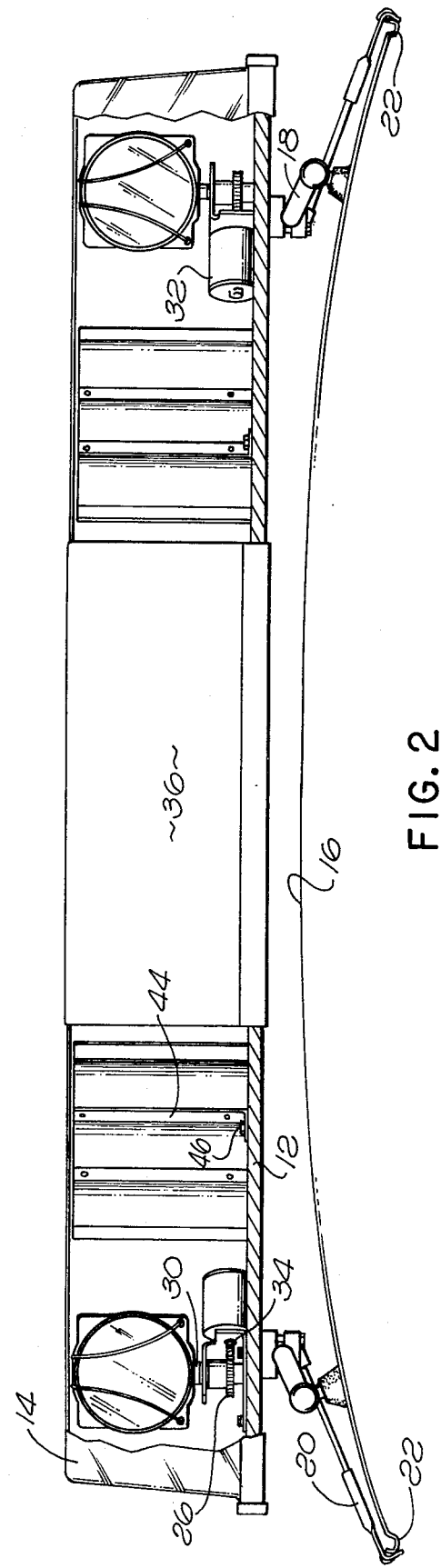

VISUAL WARNING APPARATUS FOR EMERGENCY VEHICLES

BACKGROUND OF THE INVENTION

The present invention relates generally to a visual warning apparatus and, more particularly, to such an apparatus especially suited for use on emergency vehicles.

U.S. Pat. No. 3,404,371 to Gosswiller discloses a visual warning apparatus for emergency vehicles, such as police and fire department vehicles. The apparatus comprises an elongated housing which is mounted transversely on the roof of a vehicle. A pair of signal lights are mounted in laterally spaced relation in the apparatus, one adjacent to each side of the roof. The lights are rotated about vertically extending axes. Generally parabolic reflectors are mounted in the housing between the rotatable lights. The reflectors are oriented so that when the light rays from the rotatable light impinge upon the reflectors, the rays will be deflected in generally the forward direction of the vehicle. The patent states that the reflector may have a smooth parabolic configuration or may comprise a plurality of flat sections arranged in a generally parabolic configuration. In a commercial embodiment of the visual warning apparatus disclosed in the Gosswiller patent, each reflector is made up of three flat sections arranged in a generally parabolic configuration with adjacent sections separated by narrow flat connecting sections. Such connecting sections lie in planes generally parallel to each other and extend transversely of the vehicle. The narrow flat connecting sections separate the light beams emanating from the reflector upon rotation of the rotatable light into three relatively well-defined, distinct flashes, which shift laterally across the reflector as the light rotates. Since the primary reflecting sections of the parabolic reflector are flat, the light reflected off each section has a relatively high, constant intensity.

The purpose of the present invention is to provide an improved visual warning apparatus by modifying the configuration of the reflector of the prior art apparatus in such a manner that the light deflected off the reflector has greater activity, thereby producing a more scintillating and psychedelic light effect so that the visual warning effectiveness of the apparatus is enhanced.

SUMMARY OF THE INVENTION

According to the principal aspect of the present invention, each reflector in the visual warning apparatus of the type discussed hereinabove is modified so that each principal reflecting section thereof has a convex configuration. Each reflector is oriented so that its convex sections face its corresponding rotating light. By such a reflector configuration, when light impinges thereon from the rotating light, the light rays deflected off the convex sections will produce high light activity since the intensity of the light deflected off each convex sections constantly changes. As a consequence, the visual warning apparatus of the present invention produces a highly scintillating and psychedelic light effect which enhances the warning effectiveness of the apparatus.

BRIEF DESCRIPTION OF THE DRAWINGS

FIG. 1 is a top plan view of the visual warning apparatus of the invention mounted on the roof of an emergency vehicle, showing a pair of signal lights disposed adjacent opposite sides of the vehicle roof with a speaker unit positioned therebetween, and the reflectors of the present invention positioned between each signal light and the speaker unit;

FIG. 2 is a front elevational view of the apparatus illustrated in FIG. 1;

DESCRIPTION OF THE PREFERRED EMBODIMENT

Figure 3:
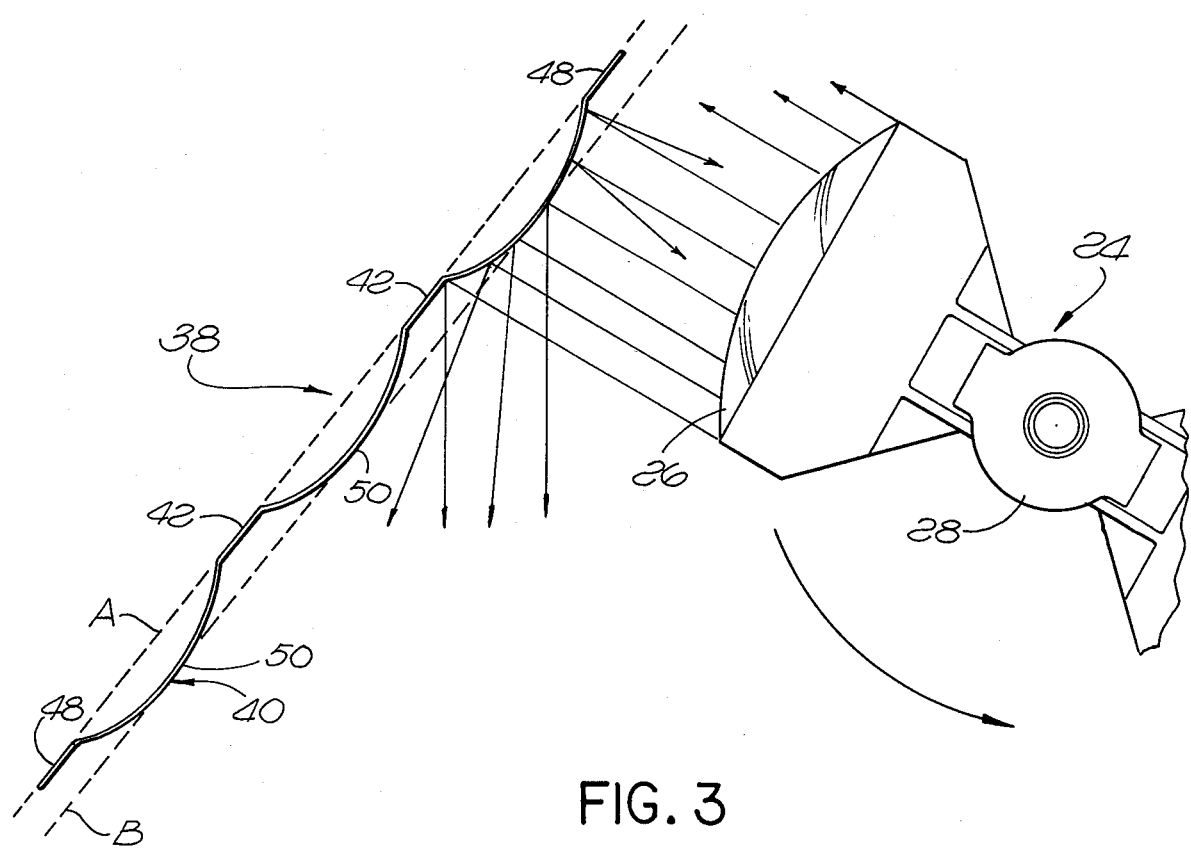
FIG. 3 is an enlarged diagramatic top plan view of one reflector of the present invention and a rotatable light associated therewith, illustrating the manner in which the light rays from the light are deflected by the reflector.

Referring now to FIGS. 1 and 2 of the drawings in detail, there is illustrated the visual warning apparatus of the present invention, generally designated 10. The apparatus comprises an elongated base 12 and a transparent housing 14 mounted thereon. The apparatus is mounted transversely on a vehicle roof 16. The base 12 is supported by a pair of brackets 18 each equipped with a clamp 20 for securing the brackets to the rain gutters 22 which extend along the longitudinal side edges of the vehicle roof. The bracket and clamp arrangement may be similar to that disclosed in U.S. Pat. No. 3,858,774, assigned to the assignee of the present application.

A pair of signal lights, generally designated 24, are mounted in the housing 14 adjacent to its opposite ends. Each signal light comprises a pair of oppositely disposed bulbs 26 mounted on a bulb holder 28. While only two bulbs are shown mounted on the holder, it will be appreciated that a greater number of bulbs may be mounted thereon, if desired to produce greater light activity. Each bulb holder 28 is mounted on a vertical shaft 30 which is rotatable about its longitudinal axis. A worm gear 26 is fixed to the shaft 30. A motor 32 is mounted on the base 12 adjacent to each shaft 30. The drive shaft of each motor 32 carries a worm 34 which engages the worm gear 26 so that upon energization of the motor, the light bulbs 26 will rotate about a vertically extending axis.

A speaker unit 36 may be mounted in the housing 14 between the rotatable signal lights 24. A reflector 38 is associated with each of the lights and is disposed between the light and the speaker unit 36. The reflectors are mounted on the base 12 of the apparatus in such a fashion that light rays emanating from the signal lights 24 will deflect off the reflectors generally forwardly of the vehicle. The apparatus described so far is generally similar to that disclosed in the aforementioned Gosswiller patent.

In accordance with the present invention, each reflector 38 comprises a plurality of convex sections 40 connected by flat, relatively narrow, vertical sections 42. Three convex sections are illustrated by way of example only. If desired, each reflector may contain either two convex sections or greater than three convex sections depending upon the light effect which is desired to be produced. The reflectors are disposed within the housing 14 so that the convex sections 40 thereof face generally in the direction of the signal lights 24 and intercept inwardly directed light rays emanating from the bulbs 26 when the signal lights are rotated. Integral mounting brackets 44 extend horizontally from the lower ends of the flat narrow sections 42 of each reflector. Mounting bolts 46 extending through the brackets 44 to secure the reflectors to the base 12 of the apparatus 10.

The reflectors may be easily and inexpensively stamped from a single tool. If desired, a large number of convex sections may be joined together in a plane to form an elongated strip. The strip may be separated between the convex sections thereof by a suitable cutting operation at locations depending upon the number of convex sections which is desired in each reflector. The reflectors are formed of a highly reflective material, such as chromed and polished steel, highly polished stainless steel, or treated and polished aluminium, for example.

It is noted that the reflector sections 40 in apparatus 10 are convex in a plane of horizontal cross-section. Each such section is preferably a segment of a vertical cylinder. The radius and cord of the cylinder may be varied to produce the desired flashing effect. A small radius and cord will permit a greater number of convex sections and, therefore, a higher flash rate per revolution of the signal light 24. A large radius and cord will permit a larger but fewer number of convex sections covering a greater span with fewer light flashes produced upon rotation of the signal light.

Referring now to FIG. 3, it is seen that the vertical sections 42 of the reflector 38 lie in a common vertical plane designated by the dotted line A. Narrow vertical segments 48 extend outwardly from the end convex sections of the reflector 38 and likewise lie in the vertical plane A. The end sections 48 are not necessary and simply result from cutting a long strip of convex sections between selected sections to form the individual reflectors. The intermediate points 50 on the convex sections 40 between the vertical sections 42 and 48 lie in a second vertical plane designated by dotted line B which is spaced from and parallel to the plane A. The foregoing reflector configuration is preferred, particularly because of the simplicity of manufacturing the same by a simple stamping operation. Variations may be made therein within the scope of the present invention so long as the principal feature of having convex reflector sections facing in the direction of the rotating signal light 24 is retained.

Figure 4:
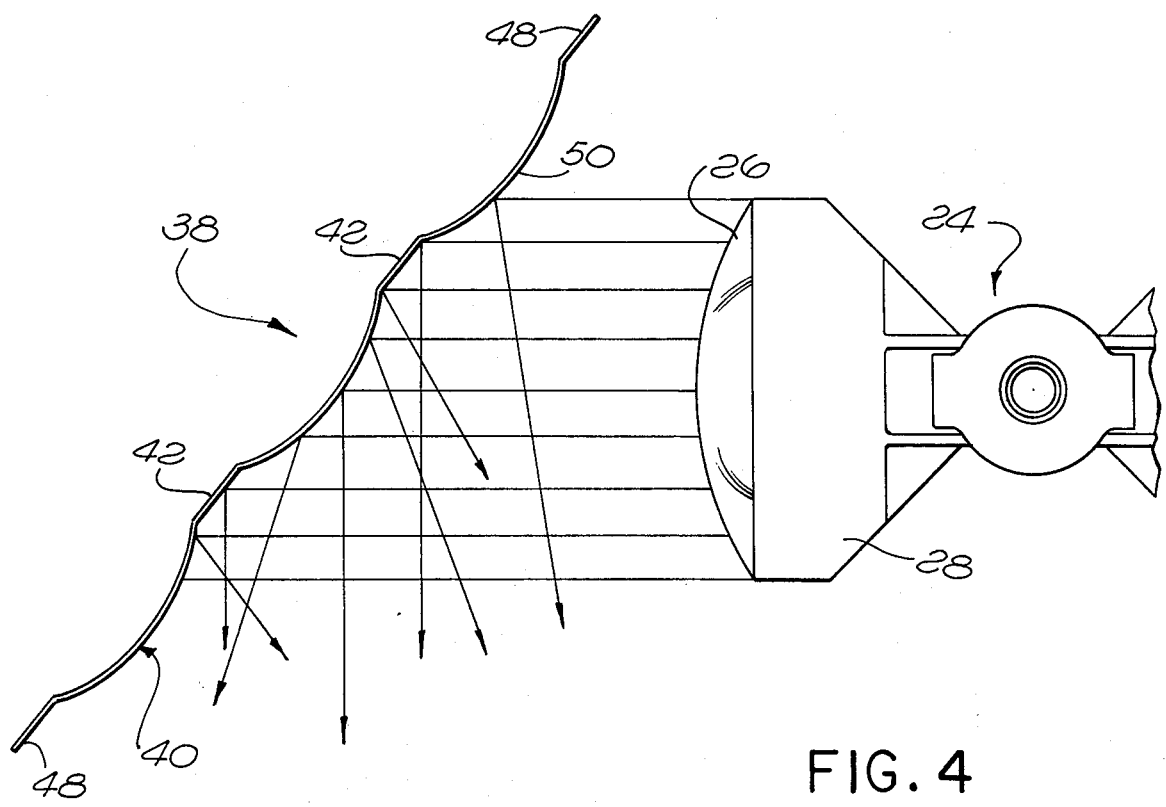
FIG. 4 is a diagramatic view similar to FIG. 3 showing the signal light in a different position and the manner in which the light rays are deflected from the reflector with the light so positioned.

In FIG. 3, the signal light 24 is shown positioned so that one of the bulbs 26 is directed toward the outer convex section 40 of the reflector. The parallel rays of light emanating from the bulb 26 are deflected generally forwardly by the convex section 40 of the reflector, although they cease being parallel after they have been deflected by the reflector. If the signal light 24 is rotated in a counterclockwise direction, as indicated by the arrow in FIG. 3, as the light passes the outer convex section 40 of the reflector, the light rays deflected off such convex section change in intensity. The intensity of the deflected light starts at a relatively low level and increases until the bulb 26 is in the position illustrated in FIG. 3 wherein the center of the bulb is directed toward the intermediate section 50 of the convex section. Thereafter, the intensity of the light decreases until the bulb 26 is directed toward the flat vertical section 42 adjacent to the outer convex section 40, wherein there is an interruption in the light rays as observed from the front of the vehicle or somewhat to the right thereof. As the signal light 24 continues rotating in the counterclockwise direction, the light from the bulb 26 impinges upon the intermediate convex section 40 of the reflector, as seen in FIG. 4, producing a second light flash which has variable light intensity as previously described. The arrows in FIGS. 3 and 4 indicate the path that the light rays follow emanating from the bulb 26 and deflecting off the convex sections of the reflector 38. Thus, by the reflector of the present invention, a series of three distinct forwardly directed light flashes are produced each of which has a variable intensity. The flashes occur in a rapid sequence and move from the outside inwardly of the visual warning apparatus assuming that the signal light at the right-side of the apparatus is rotated in a counterclockwise direction and the other light is rotated in a clockwise direction. If desired, the rotation of the lights may be reversed. However, it has been found that the bright scintillating effect of the light deflected off the reflectors is greater when the lights are rotated in the direction shown by the arrows in the drawings and described above than when the direction of rotation is reversed. It will also be appreciated that the two lights could be rotated in the same direction.

The variable intensity of the light rays deflected off the convex sections of the reflector of the present invention results in a greater light activity and, therefore, a more scintillating and psychedelic lighting effect than is produced by a generally parabolic reflector having flat reflector sections thereon, as in the aforementioned commercial embodiment of the Gosswiller invention. The greater light activity produced by the reflector enhances the effectiveness of the visual warning apparatus.

What is claimed is:

1. A visual warning apparatus for mounting on the roof of an emergency vehicle comprising:
   signal light means rotatable about a generally vertical axis;
   a reflector positioned approximately to one side of said signal light means and oriented with respect to said signal light means so as to intercept light rays emanating therefrom and deflect the same approximately lengthwise of said vehicle; and
   said reflector comprising a plurality of sections convex in a plane of horizontal cross-section, said convex sections facing toward said signal light means.

2. An apparatus as set forth in claim 1 wherein:
   each said convex section is a segment of a vertical cylinder.

3. An apparatus as set forth in claim 1 wherein:
   flat, relatively narrow vertical sections connect said convex sections.

4. An apparatus as set forth in claim 3 wherein:
   said flat sections lie in a generally common vertical plane.

5. An apparatus as set forth in claim 4 wherein:
   the intermediate regions of said convex sections in said horizontal plane lie in a generally common vertical plane substantially parallel to said first-mentioned vertical plane.

6. A visual warning apparatus for mounting on the roof of an emergency vehicle comprising:
   a pair of signal light means rotatable about respective generally vertical axes and laterally spaced from one another so as to be disposed above opposite sides of said vehicle;
   a pair of reflectors one associated with each of said signal light means;

said pair of reflectors being disposed between said signal light means with each reflector being positioned generally inwardly of its corresponding signal light means;

each said reflector being oriented with respect to its corresponding signal light means so as to intercept light rays emanating therefrom and deflect the same approximately lengthwise of said vehicle; and each said reflector comprising a plurality of sections convex in a plane of horizontal cross-section, said convex sections facing toward said corresponding signal light means.

7. An apparatus as set forth in claim 6 wherein:
each said convex section is a segment of a vertical cylinder.

8. An apparatus as set forth in claim 6 wherein:
flat, relatively narrow vertical sections connect said convex sections of each said reflector.

9. An apparatus as set forth in claim 7 wherein:
said flat sections of each said reflector lie in a generally common vertical plane.

10. An apparatus as set forth in claim 9 wherein:
the intermediate regions of said convex sections of each said reflector in said horizontal plane lie in a generally common vertical plane substantially parallel to said first-mentioned vertical plane of said reflector.

11. An apparatus as set forth in claim 6 wherein:
at least one of said light means is rotated in a direction so that the light from said light means moves from the outside inwardly on its corresponding reflector.

* * * * *